US007450474B2

(12) United States Patent
Klein et al.

(10) Patent No.: US 7,450,474 B2

(45) Date of Patent: Nov. 11, 2008

(54) DIAGNOSTIC SYSTEM AND METHOD FOR TRANSDUCERS

(75) Inventors: Jerry G. Klein, New York, NY (US); Anthony L. Scoca, Hicksville, NY (US)

(73) Assignee: Lockheed Martin Corporation, Bethesda, MD (US)

(*) Notice: Subject to any disclaimer, the term of this patent is extended or adjusted under 35 U.S.C. 154(b) by 727 days.

(21) Appl. No.: 10/786,497

(22) Filed: Feb. 25, 2004

(65) Prior Publication Data

US 2005/0185797 A1 Aug. 25, 2005

(51) Int. Cl.

| | |
|---|---|
| ***G10K 11/00*** | (2006.01) |
| ***H04B 17/00*** | (2006.01) |
| ***H04R 29/00*** | (2006.01) |

(52) U.S. Cl. ............................ 367/153; 367/13; 381/58

(58) Field of Classification Search ................. 367/153, 367/154, 13; 381/58

See application file for complete search history.

(56) References Cited

U.S. PATENT DOCUMENTS

| | | | | |
|---|---|---|---|---|
| 4,620,445 | A | 11/1986 | McKendree | |
| 4,766,575 | A | 8/1988 | Ehrlich | |
| 4,955,001 | A | 9/1990 | Guigne | |
| 5,400,297 | A | 3/1995 | Frederiksen | |
| H1528 | H | 5/1996 | McCord | |
| 5,530,678 | A | 6/1996 | Kosalos | |
| H1619 | H | 12/1996 | McCord | |
| 5,642,329 | A | 6/1997 | Zehner | |
| 5,986,972 | A | 11/1999 | Li | |
| 2005/0146985 | A1 * | 7/2005 | Doolan | 367/118 |

OTHER PUBLICATIONS

Watson et al., "In-situ acoustic calibration technique for range and bearing arrays", Oceans, 2005. Proceedings of MTS/IEEE, Sep. 17-23, 2005, pp. 2078-2083.*

Jacobsen et al., "A Note on the Concept of Acoustic Center", J Acoust. SOc. Am., 115, 1468 (2004).*

* cited by examiner

*Primary Examiner*—Ian J Lobo

(74) *Attorney, Agent, or Firm*—DeMont & Breyer LLC

(57) ABSTRACT

In accordance with the illustrative embodiment, a diagnostic method for use with multi-element transducers includes determining an acoustic center of a transducer and determining an offset of the determined acoustic center from a theoretical acoustic center of the transducer. In some embodiments, the method also quantifies the impact that the offset has on performance of a transducer array. In some embodiments, the offset is used to correct signal processing calculations that rely on assumptions about the acoustic center of each transducer in the transducer array. A diagnostic system for use with multi-element transducers includes a projector, wherein the projector generates a sound; and a mechanical fixture, wherein the fixture aligns the projector with the transducing elements in the transducer so that in combination, the projector selectively ensonifies each of the transducing elements in the transducer.

16 Claims, 6 Drawing Sheets

DIAGNOSTIC SYSTEM AND METHOD FOR TRANSDUCERS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N0030-02-C-0021 awarded by the U.S. Navy.

FIELD OF THE INVENTION

The present invention relates generally to transducers, and more particularly to a diagnostic system and method for use with transducers.

BACKGROUND

A transducer is a device that converts energy from one form into another form. One particular class of transducers provides an electrical output signal in response to an acoustic input, or an acoustic output in response to an electrical input. In the field of underwater acoustics, a transducer that is designed to accomplish the former function—produce an electrical output in response to an acoustic input—is called a "hydrophone." A transducer that generates an acoustic output signal in response to an electrical input is called a "projector." Hydrophones and projectors are commonly used for underwater ranging and detection, velocity measuring, imaging, etc.; that is, sonar.

Sonar arrays typically include multiple transducers and can take a variety of forms. In some arrays, such as the one depicted in FIG. 1, multiple transducers 102 are precisely spaced apart in a linear array 100 and towed behind a ship or submarine (not depicted). In some other arrays, such as are sometimes used in submarines, multiple transducers 102 are arranged in 2d arrays 200 (e.g., square, rectangular, etc.) and installed in the hull 206 of the submarine (see, FIG. 2). In certain sonar arrays, some of the transducers function as projectors while others function as hydrophones. In some other arrays, all transducers function as hydrophones, and in still other sonar arrays, all transducers function as projectors and hydrophones.

In active sonar arrays, such as sonar arrays 100 and 200, transducers that are operating as projectors convert electrical energy that is generated by sonar transmitter 104 into sound waves. The sound waves are launched into the surrounding water. The sound waves, which collectively propagate as an acoustic beam, travel through a region of the water in a beam to perform the intended sonar function.

By appropriately controlling phase and amplitude of the electrical signals that are applied to individual projectors in the sonar array, one or more acoustic beams having appropriate shapes can be formed and steered to scan a particular region. The region that is acoustically imaged is referred to as the "ensonification field." Objects that are located within the ensonification field reflect or scatter the acoustic beam(s), thereby generating return sound signals or "echo."

The echo is received by transducers 102 in the array that are operating as hydrophones. The hydrophones convert the echo to electrical signals, which are transmitted to sonar receiver 105. The electrical signals, which are representative of the echo, are then processed and the results are displayed in a form that is useful by sonar personnel for identifying, locating, etc., the ensonified objects.

Sometimes, the performance of a sonar array degrades over time. The degradation can result from partial or complete failure of one or more of the transducers (hydrophones) in the array. Historically, "electrical tone application" or "conductivity" tests have been used to identify malfunctioning transducers. These tests are limited, however, in their ability to identify partial malfunctions. Furthermore, these tests are generally not capable of quantifying the extent of the malfunction or predicting its affect on array performance. Once a malfunctioning transducer is identified via these techniques, it is either electronically removed from the array or physically replaced. But it might take an extended period of time before an opportunity to replace a transducer arises. And electronically removing one or more transducer(s) from a sonar array might reduce the capabilities (e.g., power, sensitivity, etc.) of the array.

Furthermore, on occasion, sonar arrays comprising newly-manufactured transducers that have passed all standard factory test requirements do not perform as expected. Since the transducers have passed standard factory tests, and short of an autopsy, there is often little that can be done to determine which of the transducers in the array are faulty. Depending upon the extent of the performance deficit, the array is either deployed with compromised performance or replaced before deployment with a concomitant delay in mission readiness.

It would, therefore, be desirable to have a new diagnostic method and system that exhibits one or more of the following attributes:

- Is more reliable and capable than prior-art techniques at identifying partially malfunctioning transducers.
- Is able to quantify the effect that a malfunctioning transducer will have on the performance of a transducer array.
- Provides data that can be used by processing electronics as a "calibration factor" to correct for the degradation of one or more transducers in the array.
- Provides data that can be used to yield the best performance from a given group of transducers by selectively positioning the "best" transducers at the most critical positions in the array.
- Complements or replaces standard factory-acceptance tests for transducers.

SUMMARY

Some embodiments of the invention provide a diagnostic method and system for use with transducers that exhibits one or more of the above-listed attributes.

In accordance with the illustrative embodiment, a diagnostic method for use with multi-element transducers comprises:

- determining an acoustic center of a transducer; and
- determining an offset of the determined acoustic center from a theoretical acoustic center.

In accordance with the illustrative embodiment, a diagnostic system for use with multi-element transducers comprises:

- a projector, wherein the projector generates a sound; and
- a mechanical fixture, wherein the fixture aligns the projector with the transducing elements (in the transducer) so the projector selectively ensonifies each of the transducing elements.

In some embodiments utilizing the illustrative diagnostic system, the operation of determining an acoustic center of a transducer includes the sub-operations of:

- aligning a projector over each transducing element;
- ensonifying each transducing element;
- measuring the output from each ensonified transducing element;

calculating the acoustic center as a weighted average of the output from the transducing elements (as a function of their position in the arrangement of transducing elements).

The acoustic center, as determined from the illustrative method and system, and its offset from the theoretical acoustic center of the transducer, can be used for a variety of purposes that define variations of the illustrative method. For example, the offset can be used for any one or more of the following purposes, among any others:

to predict the performance (deficit) of an array;

to validate newly-manufactured transducers;

to selectively position transducers in an array; and to correct signal processing calculations for the observed offset in the acoustic center.

In accordance with a further aspect of the invention, a transducer array with variably-positionable transducers is disclosed. This embodiment takes advantage of the fact that an actual acoustic center of a transducer is calculated to appropriately position the transducers relative to one another in an array.

These and other features of the illustrative embodiment of the present invention are described in detail in the following Detailed Description and depicted in the appended Drawings.

DETAILED DESCRIPTION

The illustrative embodiment of the present invention is a diagnostic method and system for use with transducers, such as are used in underwater acoustics, medicine, aeronautics, and the like. The illustrative embodiment is suitable for use only with multi-element transducers. Use of the illustrative embodiment is independent of the operating principle of the transducer; that is, it can be used with multi-element transducers that are based on a piezoelectric, magnetostrictive, or other principles of operation. Furthermore, the illustrative embodiment is useful as a diagnostic for transducers regardless of their mode of operation (e.g., hydrophone or projector, etc.).

The terms and phrases listed below are defined for use in this specification as follows:

"Acoustic Center" means (1) the origin from which an acoustic field that is generated by a transducer (e.g., projector, etc.) is considered to have emanated or (2) the point at which an echo is considered to be received by a transducer (hydrophone, etc.).

"Transducing Element" means a functional element within a transducer that is responsible for converting one form of energy into another. For example, some tranducers will incorporate a plurality of piezoelectric transducing elements. These elements, when compressed, as when exposed to a pressure wave, generate a voltage. Conversely, when an electric field is applied to these elements, they expand or contract in certain directions. Other transducers will incorporate a plurality of magnetostrictive transducing elements.

Figure 1:
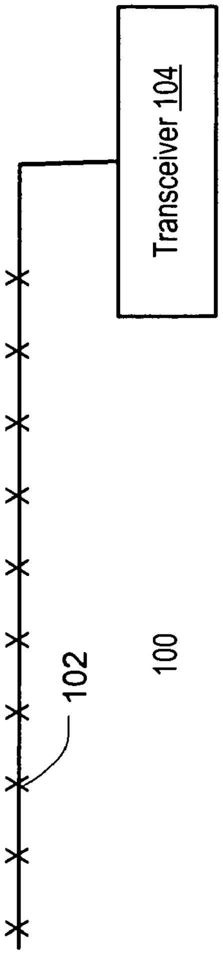
Figure 1 PRIOR ART
FIG. 1 depicts a linear sonar array in the prior art.
Figure 2:
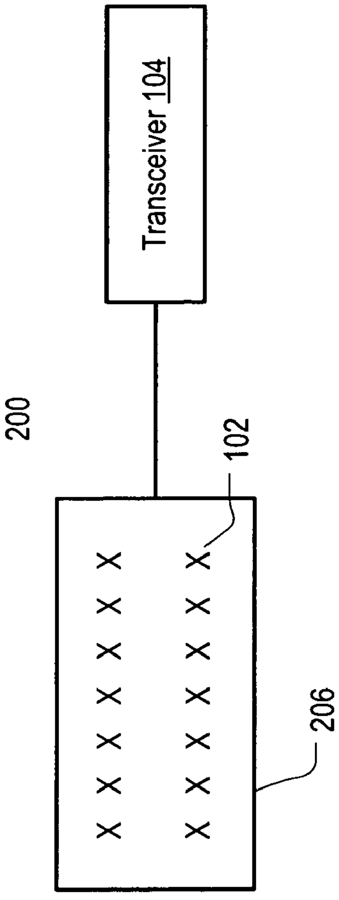
Figure 2 PRIOR ART
FIG. 2 depicts a 2d sonar array in the prior art.
Figure 3:
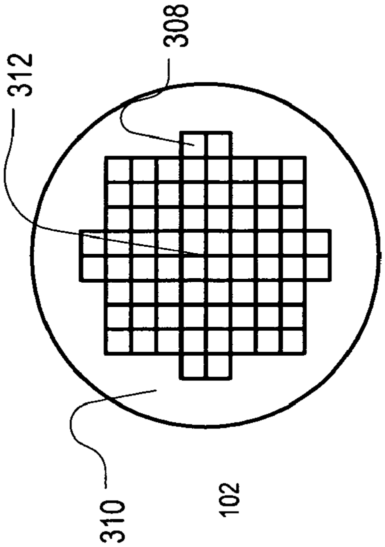
Figure 3 PRIOR ART
FIG. 3 depicts a multi-element transducer in the prior art.

FIG. 3 depicts conventional multi-element transducer 102. The transducer comprises a plurality of individually, electrically-connected, internal transducing elements 308, which are typically organized in a symmetrical arrangement, such as arrangement 310.

The acoustic center of transducer 102 is nominally located at point 312, which, in arrangement 310, is located at the geometric center of arrangement 310, as is often the case. In sonar arrays (e.g., sonar array 100, 200, etc.), which have a plurality of transducers 102, there is a precise spacing between the acoustic center of the various transducers.

It is important that the acoustic center of each transducer in an array is precisely located, because these locations form a basis for signal processing calculations (both for the transmitted acoustic beams and the received echo). Indeed, the accuracy of signal processing calculations depends on it. As a consequence, if one or more of transducers 102 is having an operational problem that causes its acoustic center to shift, then the performance of the array, in terms of its ability to accurately locate, range, identify, or obtain other information about objects, might be compromised. This is explained in more detail below.

With continued reference to FIG. 3, a failure mode, deterioration, or manufacturing defect can occur in which some of transducing elements 308 partially or completely fail (e.g., due to delamination or failure or disconnect of transducing elements 308). If this occurs, the acoustic center of the transducer shifts. As discussed above, this can affect that accuracy of the information obtained from array 100.

Figure 4:
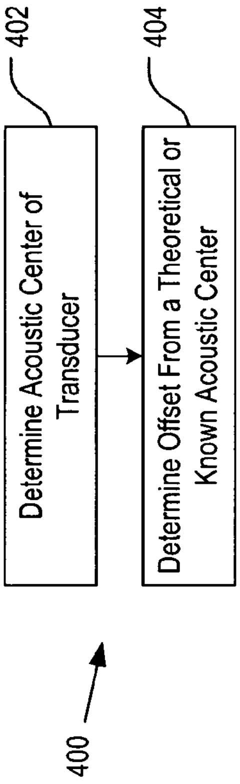
FIG. 4 depicts diagnostic method 400 for use with transducers in accordance with the illustrative embodiment of the present invention.

FIG. 4 depicts method 400 in accordance with the illustration embodiment of the present invention. According to operation 402 of method 400, the acoustic center of a multi-element transducer is determined. FIG. 8 depicts sub-operations 802 through 808 of operation 402 as well as additional optional operations used in variations of illustrative method 400. Context for the description of method 400 is provided with reference to FIGS. 6 and 7, which depict an illustrative embodiment of diagnostic system 600 for implementing method 400 on prior-art, multi-element transducer 514.

Figure 5:
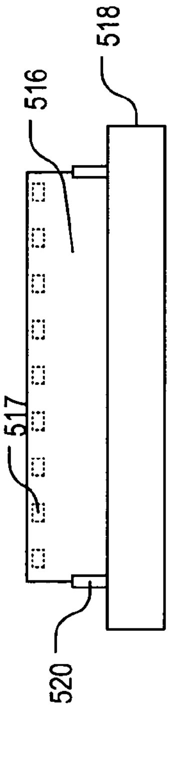
Figure 5 Prior Art
FIG. 5 depicts a side view of a multi-element transducer in the prior art.

Referring now to FIG. 5, prior-art transducer 514 includes transducer housing 516, transducing elements 517 disposed within housing 516, base 518 and mounting bolts 520. The base and mounting bolts are for installing transducer in an internal (e.g., hull, etc.)—type sonar array.

Figure 6:
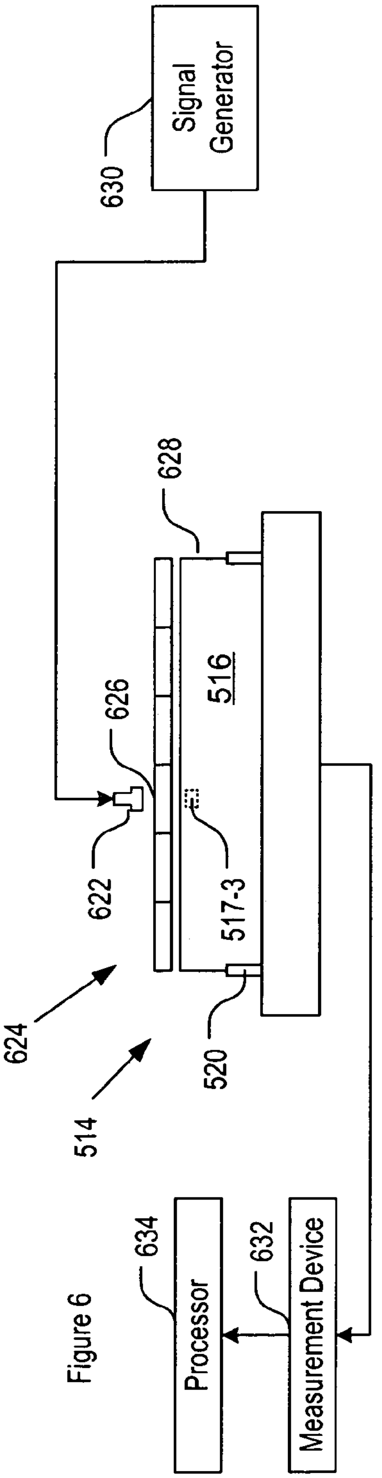
FIG. 6 depicts diagnostic system 500 in accordance with the illustrative embodiment of the present invention.

System 600 depicted in FIG. 6 includes test projector 622 and mechanical fixture 624. Projector 622 is electrically coupled to signal generator 630 and receives a signal therefrom. The projector emits sound in response to this electrical input. The sound generated by projector 622 is directed toward transducing element 517-3 of transducer 514.

Figure 7:
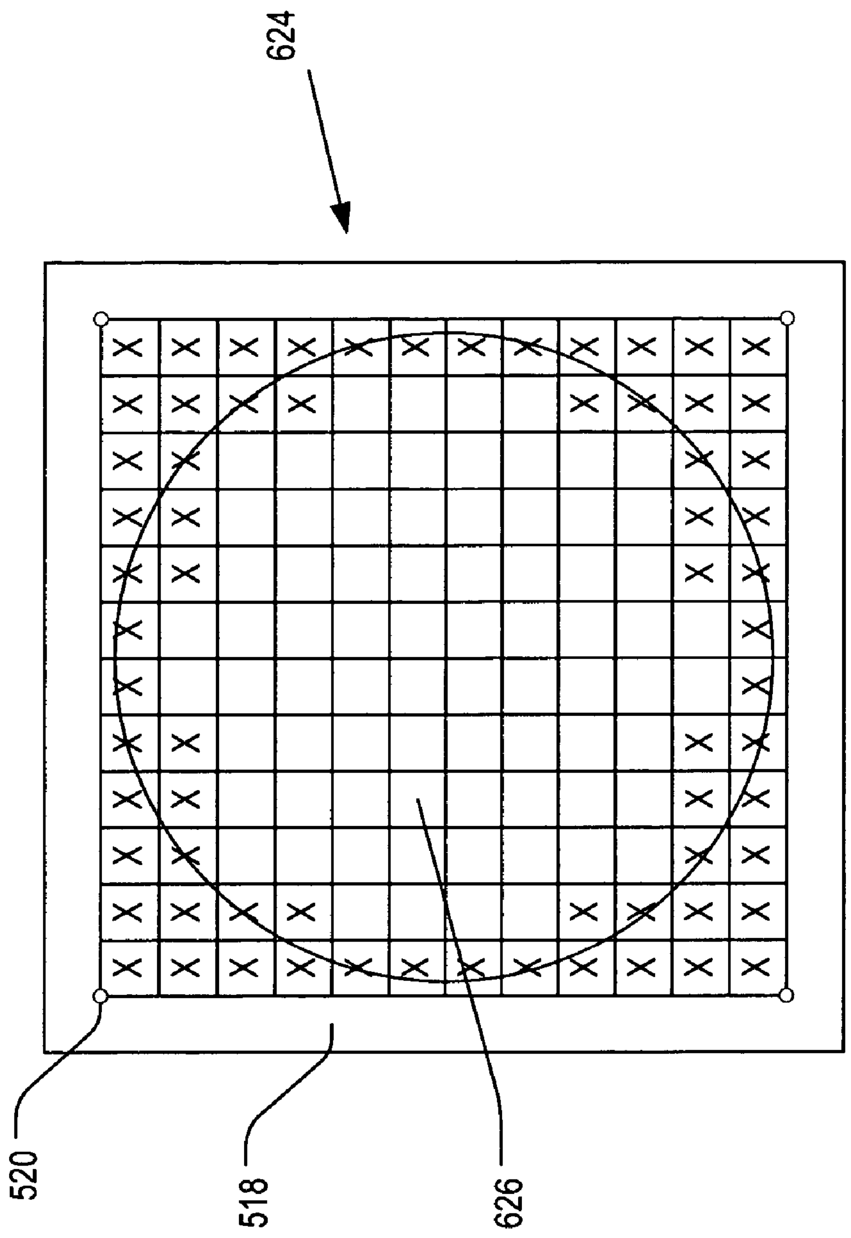
FIG. 7 depicts a template for use with diagnostic system 500.
Figure 8:
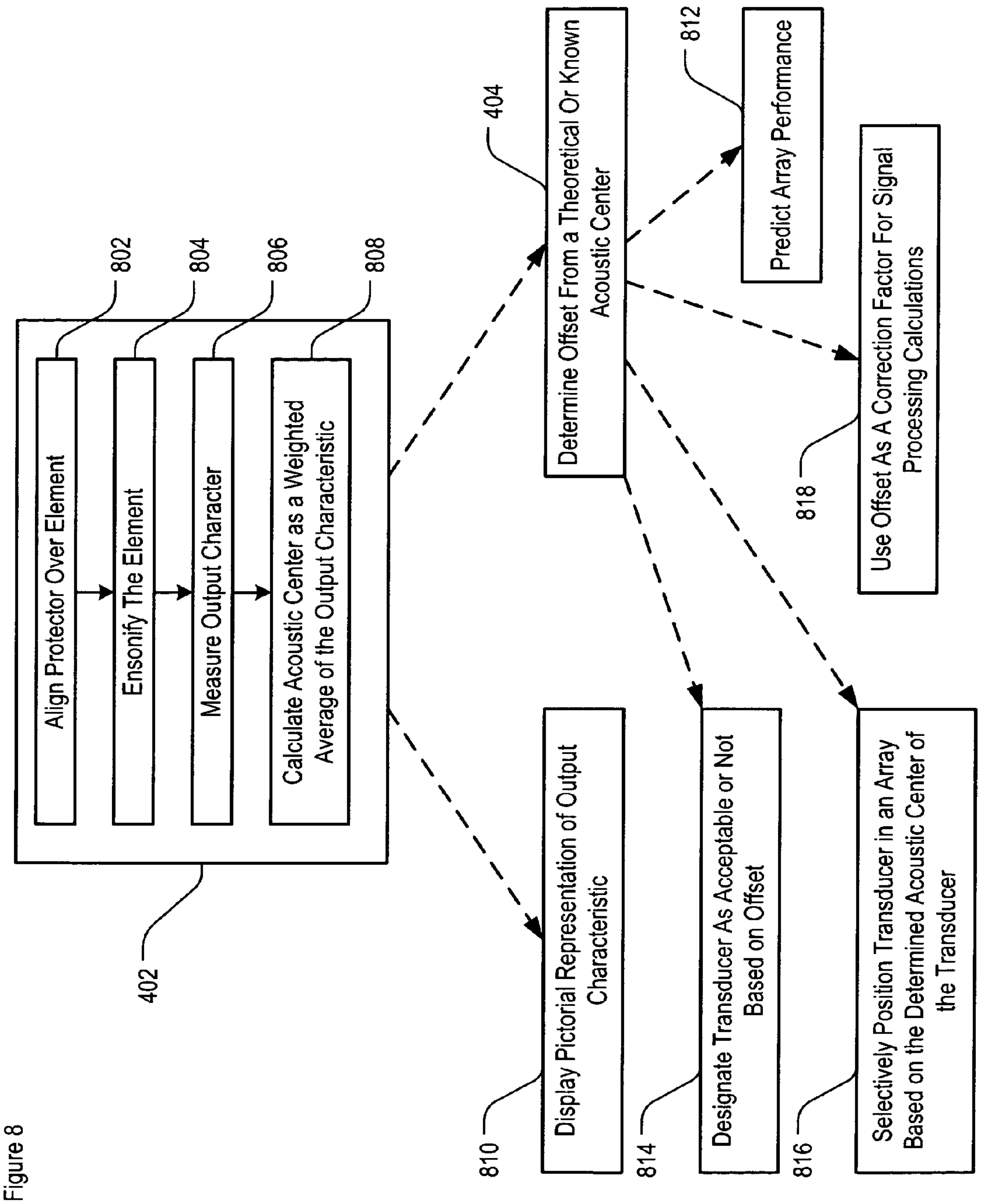
FIG. 8 depicts sub-operations of operation 402 of method 400, and additional optional operations in variations of method 400.

Referring now to FIGS. 6 and 7, mechanical fixture 624 is an alignment device that aligns projector 622 over the center of underlying transducing element 517 of the transducer. This ensures that the sound that is emitted by projector 622 is directed to a specific transducing element. In the illustrative embodiment, fixture 624 is implemented as grid, which defines a plurality of grid elements 626. When fixture 624 is properly aligned over transducer 514, elements 626 of the grid overlie the various transducing elements 517 of transducer 514. In some embodiments, alignment fiducials are provided to align fixture 624 with transducing elements 517 in the transducer. For example, in the illustrative embodiment, mounting bolts 520 are used as an alignment fiducial wherein members 628 of fixture 624 cooperate with the mounting bolts to align grid elements 626 to the underlying transducing element 517. Projector 622 is appropriately dimensioned to cooperate with fixture 624. It will be appreciated that other arrangements can be used. For example, although more complicated, transducer 514 can be positioned on a x-y stage (not depicted), wherein each transducing element 517 is brought into alignment with a projector that is held stationary.

In some embodiments, projector 622 is moved from grid element to grid element to ensonify each underlying transducing element 517, one at a time. In some other embodiments, multiple projectors are used to simultaneously ensonify two or more transducing elements. In some embodiments, such as the one depicted in FIG. 7, not all grid elements 626 overlie a transducing element 517. In FIG. 7, grid elements 626 that do not overlie a transducing element are indicated by an "x." In some embodiments, mechanical fixture 624 is configured so that grid elements 626 that do not overlie a transducing element are blocked (e.g., not open, etc.). To ensure good acoustic coupling of projector 622 to each transducing element 517, a suitable acoustic grease or other means is advantageously used.

In response to the sound that it receives, each transducing element 517 generates an output, which is typically measured as a voltage. The output from each transducing element is measured by measurement device 632, which in the illustrative embodiment is a spectrum analyzer.

The output from measurement device 632 is collected and then processed in processor 634. In some embodiments, processor 634 calculates the acoustic center of the transducer under test. This can be done, for example, by calculating a weighted average of the output characteristic (e.g., voltage, etc.) of each transducing element 517 as a function of a relative location of the element, in known fashion.

In some embodiments, processor 634 calculates the offset of the actual acoustic center (as determined from the present method and system) from the theoretical acoustic center (typically the geometric center of the arrangement of transducing elements 517), as per operation 404 of method 400. Processor 634 provides an indication of the actual acoustic center or the offset or both. The acoustic center or offset is presented as is convenient, for example, as a Cartesian coordinate or a polar coordinate, with the coordinate system centered at the geometric center of the arrangement of transducing elements.

Returning now to the description of operation 402 of method 400 (determine the acoustic center of the transducer), system 600 can be used to carry out sub-operations 802 through 808 for implementing operation 402, including:

Sub-operation 802: Align projector over transducing element;

Sub-operation 804: Ensonify transducing element;

Sub-operation 806: Measure output from ensonified transducing element; and

Sub-operation 808: Calculate the acoustic center as a weighted average of the output from the transducing element.

Additionally, in some embodiments, as per optional operation 810, the output obtained from transducing elements 517 is represented pictorially. Such a pictorial representation can be displayed electronically by a monitor (e.g., computer display, etc.) or printed. An example of such a pictorial representation is depicted in FIGS. 9 and 10.

Figure 9:
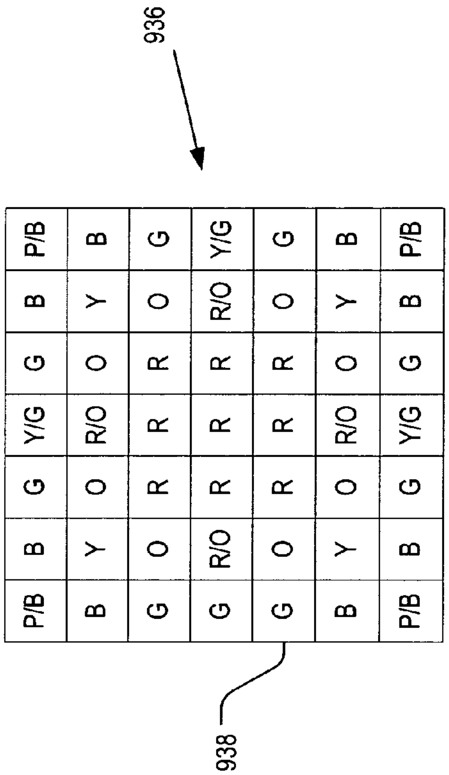
FIG. 9 depicts a pictorial representation of the performance of an array of tranducing elements of a transducer, wherein the representation exhibits a high degree of symmetry in the output of the transducing elements, indicative of good transducer performance.
Figure 10:
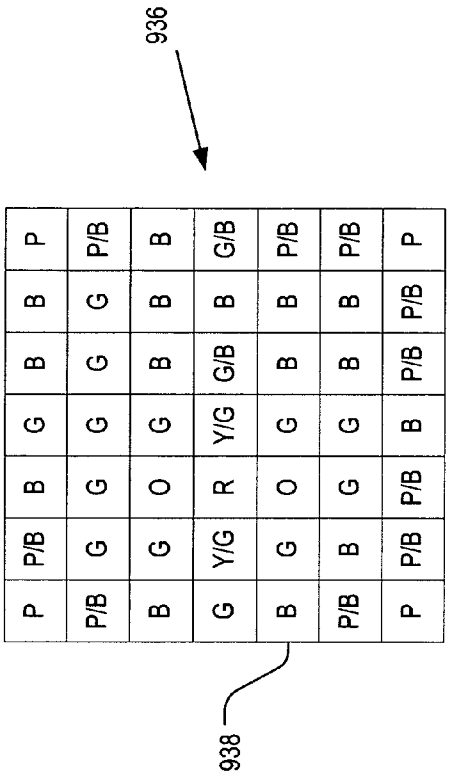
FIG. 10 depicts a pictorial representation of the performance of an array of tranducing elements of a transducer, wherein the representation exhibits a high degree of asymmetry in the output of the transducing elements, indicative of unacceptable transducer performance.

FIG. 9 depicts a pictorial representation of the electrical output from a first transducer. The pictorial representation comprises array 936 of "pixels" 938. The electrical output (e.g., voltage, etc.) is represented by the color of each pixel, which, in order of descending electrical output are:

R (red)>R/O (red-orange)>O (orange)>Y (yellow)>Y/G (yellow-green)>G (green)>B (blue)>P/B (purple-blue) >P (purple).

In some embodiments, there is a one-to-one correspondence between pixels 938 and transducing elements 517. That is, the color of a pixel is representative of the electrical output of a corresponding transducing element. But in some other embodiments, there is not a one-to one correspondence between pixels and transducing elements. For example, in some embodiments, each pixel represents an average of the output of two adjacent pixels, etc.

Of more importance than the specific color of a given pixel in array 936 is the symmetry, or lack thereof, of the color pattern that is presented by array 936.

In particular, as can be seen in FIG. 9, the output of the transducing elements defines a nearly symmetric pattern. As a consequence, the measured acoustic center of the first transducer aligns with the theoretical (and in this case geometric) center of the array of transducing elements. This is excellent measured performance, which evinces a normally-operating transducer.

FIG. 10 depicts a pictorial representation of the electrical output from a second transducer. The output of the transducing elements defines a severely asymmetric pattern. This means that some of the transducing elements are not operating properly or they are otherwise disconnected from the electrical circuitry within the transducer. For this transducer, the measured acoustic center will not align with the theoretical acoustic center.

Although the information presented by the pictorial representation is qualitative, rather than quantitative, it provides a technician or other interested party with a sense of the "health" of a transducer. In fact, with experience, a glance at the pictorial representation of a given transducer might be a sufficient basis to reject or accept it as suitable for a particular service.

While the information provided by the pictorial representation is qualitative, the determination of the actual acoustic center or determination of the offset from the theoretical acoustic center provides quantitative information that was not heretofore available. This information can be used in a variety of ways, as follows.

For example, in accordance with optional operation 812, the offset can be used to predict the performance of a transducer array (e.g., sonar, etc.). In particular, transducers typically have a defined and invariant location within a linear or 2d array. Signal processing calculations for beam forming or echo interpretation assume that the acoustic center of the transducer is the theoretical acoustic center. To the extent that the actual acoustic center of one or more of the transducers in such an array is offset from the theoretical center, then the performance of the array is degraded. Since the illustrative embodiment of the present invention calculates the amount of offset, it can be used to quantify the degradation in performance of the array. For example, in some embodiments in which the transducer array and signal processing provides a velocity-measuring system based on correlation processing, the offset of the acoustic center is used to predict error in the prediction of velocity.

In a further variation of method 400, and in accordance with operation 814, the offset of the acoustic center can be used during formal acceptance testing of newly-manufactured transducers. In particular, if the offset between the actual and theoretical acoustic centers exceeds some threshold, then the transducer is rejected. It will be appreciated that the threshold is application specific. For example, for some military sonar applications, the allowed offset will be quite low. For other military or civilian applications, the allowable offset will typically be relatively higher.

In yet a further variation of method 400, and in accordance with operation 816, information concerning the position of the acoustic center can be used to selectively position transducers in an array. Some positions in an array of transducers will be relatively more critical (i.e., more heavily weighted) in terms of signal processing calculations. Once the offset of the acoustic center for each transducer in a group of transducers is known, the transducers can be selectively placed in the array for best performance.

In still another variation of method 400, and in accordance with operation 818, the offset in acoustic centers of a plurality of transducers in an array is used as a correction factor during signal processing calculations. In other words, to the extent that the offset in the acoustic center of each of the transducers in an array is known, those offsets can be used to correct the signal processing calculations (e.g., beam-forming, echo interpretation, etc.), which are otherwise based on the assumption that the actual acoustic center is the theoretical acoustic center. This method aids in maintaining the performance of an aging transducer array until such time as it is desirable to physically replace the transducers in the array. And it can also be used to improve the performance of a sonar array.

Figure 11:
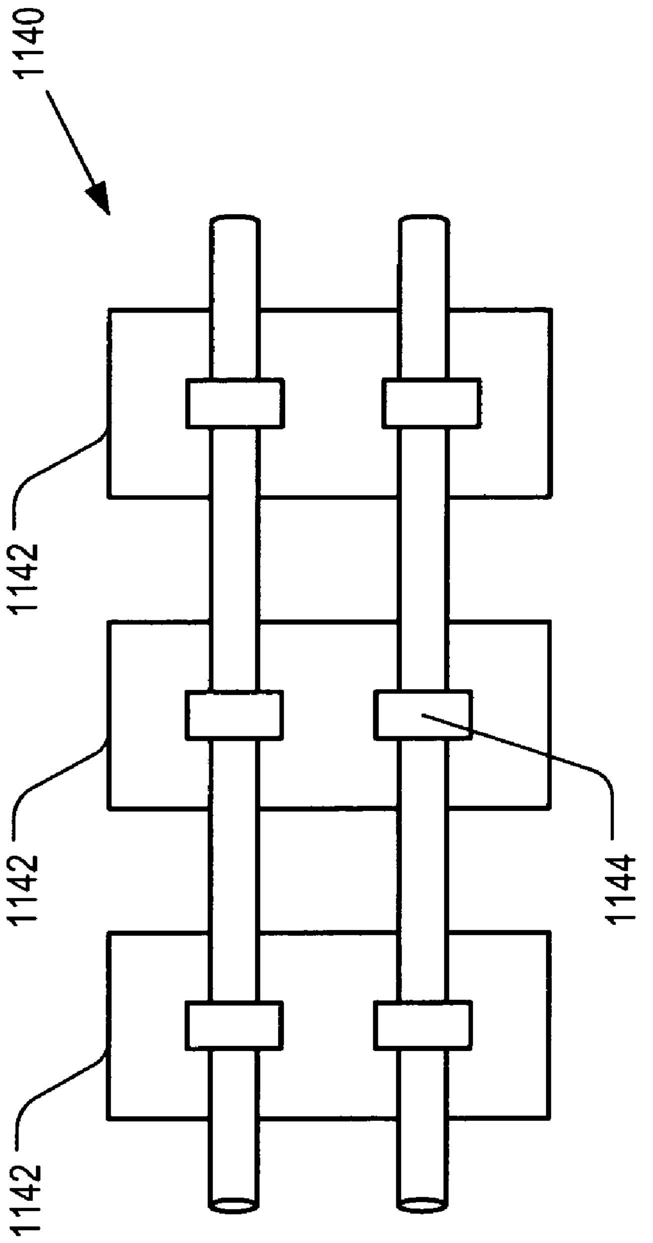
FIG. 11 depicts an array having variably-positionable transducers.

A further aspect of the present invention is transducer array 1140 with variably-positionable transducers 1142, as depicted in FIG. 11.

In the prior art, the position of each transducer in an array is typically fixed. As a consequence, the offset between the theoretical acoustic center and the actual acoustic center is needed to determine the affect on performance and correct signal-processing calculations.

But by virtue of the illustrative method and diagnostic system, wherein an ability to calculate an actual acoustic center of the transducer is provided, there is a motivation to provide an array having transducers that are variably positionable.

Once in a desired position, transducers 1142 are held in place via gripping mechanism 1144. Although depicted as a collar, the gripping mechanism can be implemented in as desired (e.g., clamps, pins, etc.). Those skilled in the art will be capable of designing and building many different configurations of an array with variably-positionable transducers in light of the present teachings.

For variably-positionable arrays, and for fixed arrays as well, in some embodiments, methods that incorporate the various optional operations, such as operations 812 through 818, are not based on a calculated offset, but rather the calculated acoustic center.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

We claim:

1. A method comprising:

determining an acoustic center of a transducer, wherein said transducer has a plurality of transducing elements; and determining an offset of the determined acoustic center from a theoretical acoustic center.

2. The method of claim 1 wherein determining an acoustic center comprises ensonifying each of said transducing elements, one transducing element at a time.

3. The method of claim 1 wherein determining an acoustic center comprises ensonifying each of said transducing elements, wherein at least two of said transducing elements are ensonified simultaneously.

4. The method of claim 1 wherein determining an acoustic center comprises:

disposing a projector near a transducing element; and ensonifying said element using said projector.

5. The method of claim 4 wherein determining an acoustic center comprises driving said projector by a signal generator.

6. The method of claim 1 wherein determining an acoustic center comprises obtaining an electrical response from each of said transducing elements.

7. The method of claim 6 wherein determining an acoustic center comprises electronically processing said electrical response using an algorithm.

8. The method of claim 6 wherein determining an acoustic center comprises generating a pictorial representation of said electrical response from each said transducing element.

9. The method of claim 1 further comprising designating said transducer as being one of either acceptable or not acceptable as a function of said offset.

10. A method comprising determining an acoustic center of each of a plurality of transducers, wherein each transducer has a plurality of transducing elements, and wherein the acoustic center of each of said transducing element in said (a) measuring a response characteristic of each transducing element in said transducer; and (b) calculating a weighted average of said response characteristic of each transducing element as a function of a location of said transducing element relative to other of said transducing elements in the transducer.

11. The method of claim 10 comprising determining an offset, for each transducer, from a theoretical or desired acoustical center.

12. The method of claim 11 comprising basing formal acceptance testing of each said transducer based on said offset for each of said transducers.

13. The method of claim 11 comprising predicting performance of an array of said transducers based on said offset of each of said transducers.

14. The method of claim 11 comprising selectively positioning said transducers in an array based on said offset of each of said transducers.

15. The method of claim 11 comprising basing signal processing calculations for an array of transducers on said offset of each of said transducers.

16. A method comprising:

calculating an acoustic center of each of a plurality of multi-element transducers;

calculating an offset for each of said plurality of multi-element transducers, wherein said offset is based on said calculated acoustic center and a theoretical acoustic center of each of said multi-element transducers; and correcting signal processing calculations using said offsets.

* * * * *